US005671591A

United States Patent [19]

Fleenor

[11] Patent Number: 5,671,591
[45] Date of Patent: Sep. 30, 1997

[54] INTEGRATED CONTAINER MOULDING AND FILLING FACILITY

[75] Inventor: Bruce Forester Fleenor, Roswell, Ga.

[73] Assignee: Ashland, Inc., Russell, Ky.

[21] Appl. No.: 432,398

[22] Filed: May 1, 1995

[51] Int. Cl.$^6$ .......................... B65B 29/00; B65B 31/00; B65B 55/24
[52] U.S. Cl. .................. 53/452; 53/426; 53/561
[58] Field of Search .................. 53/452, 561, 559, 53/426, 425, 401, 403, 405, 79, 110

[56] References Cited

U.S. PATENT DOCUMENTS

| | | | |
|---|---|---|---|
| 3,911,640 | 10/1975 | Rausing | 53/471 X |
| 3,972,153 | 8/1976 | Kiellarson et al. | 53/426 |
| 4,208,852 | 6/1980 | Pioch | 53/561 X |
| 4,597,242 | 7/1986 | Hendricks et al. | 53/426 |
| 5,242,468 | 9/1993 | Clark et al. | 29/25.01 |
| 5,488,811 | 2/1996 | Wang et al. | 53/426 X |

OTHER PUBLICATIONS

*Characterization of Polyethylene as a Packaging Material for High Purity Process Chemicals* Thomas B. Hackett and Keith D. Dillenbeck, Ashland Chemical Company May 2–7, 1993.

*Understanding the Particle Shedding Phenomena in Polyethylene Containers for Semiconductor Process Chemicals* Thomas B. Hackett and Keith D. Dillenbeck, Ashalnd Chemical Company 1991.

*Packaging High Purity Chemicals to Ensure Low Particulate Contamination At Point–of–Use* Thomas B. Hackett and Stephen S. Hupp, Ashland Chemical Company 1990.

*Determination of Leachable metallic Impurities from Semiconductor Chemical Packaging Material* Tom Talasek, Lindsey Hall, Leanne Mallini, Valerie Sewall Microcontamination 94 Conference, Oct. 4–6, 1994.

*Identifying Organic Impurities in Inorganic Process Chemicals by Solid–Phase Extraction* Tom Talasek, Lynn Vanatta, Brenda Lucero and Tricia Schoenke Microcontamination Jun. 1993.

*Determination of Trace Organic Impurities in Semiconductor Processing Chemicals* Mark J. Camenzink, Marjorie K. Balazs Microcontamination Conference Proceedings, Oct. 16–18, 1991.

*Primary Examiner*—James F. Coan
*Attorney, Agent, or Firm*—Mary E. Picken

[57] ABSTRACT

This invention is an integrated system for making containers and filling them with ultra high purity chemicals all within a cleanroom environment so that the chemicals avoid contamination and meet semiconductor manufacturing purity standards.

20 Claims, No Drawings

INTEGRATED CONTAINER MOULDING AND FILLING FACILITY

FIELD OF THE INVENTION

This invention relates to the bottling of ultra high purity chemicals used in the manufacture of integrated circuits.

BACKGROUND

The need for higher purity semiconductor chemicals continues to evolve to meet the requirements associated with the increasing complexity of the integrated circuit process. Close attention must be paid to all contamination sources that can affect the purity of the process chemical from chemical manufacturing to point of use. One solution is described in U.S. Pat. 5,242,468 Clark where ultra-high purity liquid cleaning and etching agents are prepared at the site of use from gaseous raw materials. Such high purity is compatible with semiconductor manufacturing standards which are defined as a resistivity of ultra pure water of at least 18 megohm-era at 25° C, less than about 25 ppb of electroytes other than said agent itself, a particulate content of less than 150/ml and a particle size less than 0.2 micron, a microorganism content less than 10/ml and total organic carbon less than 100 ppb. The chemical container represents the greatest potential source of ionic, organic, and particulate contamination.

Most container manufacturing facilities are not in cleanroom environments. Transportation of the container from the manufacturing facility to the chemical packaging facility introduces additional contamination. Because of unclean manufacturing and transportation contamination, drums and bottles for high purity chemicals must be cleaned before they are filled with high purity chemicals

DESCRIPTION OF THE INVENTION

An integrated container manufacturing and chemical packaging facility can alleviate many of these contamination problems. Critical issues in container manufacturing and packaging include material of construction, resin selection, environmental contamination, and control of the blow-molding operation. In this invention controlling and integrating the manufacturing and packaging operation controls particle contamination and reduces all metallic contamination to less than 1 part per billion.

As the microelectronics industry follows a constant evolutionary path, raw material and equipment suppliers to this segment must do likewise to meet the needs of this changing market. Increasing device complexity has led to shrinking geometries which in turn has heightened the concern over impurities contacting the wafer surface. In order to achieve the required purity of process chemicals at the surface of the wafer, a synergistic approach is essential in order to address all of the potential sources of chemical contamination. These sources include the raw materials, the chemical synthesis process, the purification process, the packaging process, the chemical container, and the distribution process to the wafer fabrication facility. As the purity requirements for process chemicals become more stringent, the quality of the packaging containers must improve to maintain purity as chemicals are transported and stored prior to use.

In order to understand and eliminate the container's contribution of contaminates (metallic and particulate) to the wafer process, it is important to characterize the entire container fabrication and handling process. The parameters that influence the cleanliness of a chemical container are:

Materials of construction or resin type (chemical compatibility).

Cleanliness of the resin manufacturing process.

Cleanliness of the blow molding fabrication process.

Cleanliness of the environment after the container is fabricated.

Container handling steps prior to washing and filling.

Container washing process.

Cleanliness of the environment used to clean and fill the container

The production requirements of a container used to package electronic grade chemicals far exceed those found in the standard industry or consumer market. Strict attention must be paid to the plastic resin raw materials used in the process as well as the air used in the blow molding process. Even if the resin and air are perfect, events await the bottle after the molding process that can contaminate it, making it unfit for use in high purity chemical packaging. In order to produce a clean container and maintain that state of cleanliness through the packaging process, it has been discovered that building a cleanroom one gallon bottle manufacturing facility adjacent to the cleanroom chemical packaging area eliminates the potential for contamination of the chemicals produced. This is the "integrated facility" of this invention.

Proper resin selection is important. High density polyethylene (HDPE) is the best choice for packaging electronic chemicals due to its excellent chemical resistance, strength, impact resistance and ease of fabrication for various size containers (Hackett T. B. and K. Dillenbeck, "Characterization of Polyethylene as a Packaging Material for High Purity process Chemicals", Proceedings—Institute of Environmental Sciences, 39th Annual Technical Meeting, Las Vegas, Nev. May 2–7, 1993). As there are numerous sources of high density polyethylene, these must be evaluated to assess their suitability for electronic chemical applications.

Since a metallic catalyst is used in the manufacture of HDPE resins and the catalyst remains in the resin, there is a possibility that residual catalyst might leach from the polyethylene and into process chemicals. Catalyst metals are typically chromium or titanium. Before a HDPE resin is selected for use in a semiconductor packaging application, a test for metal leachables must be performed. In addition to metal catalyst remnants, it has been shown that many metals are leached from HDPE containers which may not originate from the resin but instead from the container manufacturing process ("Determination of Leachable Metallic Impurities from Semiconductor Chemical Packaging Material", Proceedings—Microcontamination 94 Conference, Santa Clara, Calif. Oct. 4–6, 1994, Talasek, T., Hall, L. Mallini, L. and Sewall, V.).

Another important factor in selecting a HDPE resin is the level of organic leachables. Since polyethylene is susceptible to oxidation by exposure to heat or ultraviolet radiation, additives are typically compounded into HDPE resins. Processing stabilizers commonly used are phenolic and phosphite compounds which scavenge free radicals. Light stabilizers usually are hindered amines which limit ultraviolet damage to the polyethylene. The level of organics in HDPE resin can be determined by Soxhlet extraction techniques, supercritical fluid extraction ("Determination of Leachable Organics from Semiconductor Chemical Packaging Material by Supercritical Fluid Extraction", Proceedings—Microcontamination 94 Conference, Santa Clara, Calif., Oct. 4–6, 1994 - Talasek, T., Hall, L., Vanatta, L., and Knowles, D.), or headspace gas chromatography. Considerable variation exists in the level and composition of organic leachable material among the various sources of HDPE resin manufacturers. Organics that are leached from the polyethylene bottle can be found and quantified in process chemicals ("Determination of Trace Organic Impurities in Semiconductor Processing Chemicals", Proceeding—Microcontamination 91 Conference and Exposition, San Jose, Calif., Oct. 16–18, 1991 —Camenzind, M., Tan, S., and Balazs, M. and "Identifying Organic Impurities in Inorganic Process Chemicals by Solid-Phase Extractions", Microcontamination, 11 (6), 43–45, 1993—Talasek, T., Vanatta, L., Lucero, B., and Schoenke, T). The effect of these organics in the chemicals can range from discoloration of the liquid to increased potential for particle shedding of the container over time. As a worst case, these organics can leave residues on the wafer surface. The severity of the problem is directly related to the amount of organic leachables present in the resin and thus an important resin selection criterion is achieving a low organic leachable level.

In a typical blow molding operation, conveyers, grinders, material handing equipment, and the blow molding machine introduce numerous particles to the production environment. The operating environment can be open to the outside environment or loading dock facilities where air particle levels are high. It is not unusual to measure air particle counts and find in excess of one million particles greater than 0.3 microns in size per cubic foot of air. Container manufacturers are generally not aware of contamination control issues and do not appreciate the importance of controlling particles in the manufacturing areas. However, in semiconductor chemical packaging applications, the air quality at the bottle manufacturing location is very important.

In the blow molding process, molten polyethylene is extruded into a circular parson. The container molds are clamped around the parson and compressed air is injected to inflate the molten parison to form the container. If, in this process, the compressed air contains particles then these particles will impinge on the interior surface of the container. As the container cools and solidifies, the particles become physically attached. These particles are difficult to remove by simple washing of the container. Therefore, the air used in blow molding containers must be filtered to a high level to prevent bottle contamination.

Most polymeric materials have high electrical resistivity and thus retain electrical charges for a long time. Static charges on plastic bottles originate when the polyethylene resin is extruded and blown in contact with the metal molds. The loosely held electrons on the molds migrate to the freshly blown container resulting in a static charge. The static charges from various bottle manufacturers were measured by a Simco FM 200 Electrostatic Field Meter. Static charges from 2000 to 5000 volts are typical but charges up to 50,000 volts have been recorded on blow molded bottles.

Static charge on bottles can be detrimental in several ways. The static charge attracts atmospheric particles that may find their way into the containers, resulting in higher particle counts in the process chemical. It is more likely that the particles will attach themselves to the outside of the container. In this case the particles on the bottles will be carried into the wafer fabrication area. Air ionizers in the lab would neutralize the charge and result in a contaminating particle burst. Static charge is also a safety issue because of the possibility of ignition of flammable vapors in the bottle filling operation.

Two separate static control systems are installed in the bottle manufacturing facility to remove static charges from the bottles. Both systems use electrical discharge, which is the most commonly used method for the control of static electricity ("Static Forces and Magnetic Fields—Part 1: Research on Adhesion of Particles to Charged Wafers Critical in Contamination Control"—Microcontamination, October 1989—Ohmi, T., Inaba, H., and Takenami, T). For these systems no radioactive source is present and thus no potential for alpha particle contamination is introduced. Directly after the annealing operation, bottles are conveyed under an Ion Systems' ZSTAT Model 6664 ISOSTAT FLOWBAR. This air ionizer is designed to work in a dynamic air flowing system. This ISOSTAT FLOWBAR is placed under a high efficiency particulate air filter which blows clean ionized air over the newly manufactured bottles.

To further ensure that static charges are removed from the bottles a self-contained ionizing chamber, ZSTAT Model 6210 is installed in the tunnel conveying the one gallon HDPE bottles from the bottle manufacturing cleanroom into the bottle filling cleanroom. This gas ionizer is connected to a filtered compressed air source flowing past tungsten alloy emitter pins. The surface in contact with the flowing gas is made of TEFLON casting for specific use for cleanroom applications. This ionized air is swept around the containers and neutralizes electrical charges on their surfaces.

This facility is designed with features that isolate particle generating sources that could contaminate the one gallon blow molded bottles. A major feature is the isolation of the blow molding machine head from the body of the extruder. This isolation separates major particle generating sources from the cleanroom. The blow molder is a 15 ton Uniloy reciprocating screw with intermittent extrusion and a 100 HP rotary drive. Heating elements and hydraulic pneumatic valves used to operate the system are isolated from the bottle forming step. Oil leaks from the high pressure hydraulics on molding machines are possible and thus represent a possible organic contamination source in blow molding operations. A room was built around the molding machine to eliminate all these particle generating sources.

Another major source of particles is in the movement of polyethylene resin pellets to the blow molder. An air blower on top of the blow molder is actuated when additional resin is required. By isolating this piece of equipment, the working area is not contaminated. Other operations that are remote to the blow molding process are the grinder, regrind bin, blender, and vacuum system that removes resin from the silo. All this equipment (including the molding machine) is housed in a room separate from the molding floor and remains at a lower pressure than the cleanroom molding area to ensure contamination-free manufacturing of the blow molded bottles. Today's blow molding process is much advanced over a decade earlier. These advances result in superior bottles in terms of uniformity and consistency. One such development is in the control of resin placement in the molten parson. After the polyethylene resin is melted in the extruder, the melt is pushed through an annular die to form the parison. Since the bottle contains curves, pinch off points, handles, and changing dimensions, ideally the parison profile should vary to compensate for the changing bottle dimensions. The blow molder, used at this facility, allows for one hundred dimension adjustments throughout the length of the parison to allow the optimum mount of resin to be placed in the bottle.

Another area of improvement is in the area of mold design. The impact of sufficient mold cooling and control is critical to maintain bottle dimensions. The impact of falling to control neck and thread dimensions can result in drop test failures and leaky containers. Recent advances in automation in the Uniloy MACO 8000 controller allows for consistent round the clock production of the blow molding process.

The quality of air used in bottle manufacturing is an important variable to overall bottle cleanliness. The three specific areas that require highly filtered air are: blow air which is used to inflate a molten polymer parison, leak detector air which is blown directly into bottles, and air in the general manufacturing environment. The primary concern is the blow air quality. If this air is particle-laden, particles will impinge on the inside surface of the container and become attached. These attached particles are difficult to remove by washing the container and will remain attached until solvated by aggressive process chemicals. Therefore, it is essential that the blow air be highly filtered and contain a low level of particle contamination. The effect of blow air quality on process chemical has previously been determined ("Understanding the Particle Shedding Phenomena in Polyethylene Container for Semiconductor Process Chemicals", Proceedings—Microcontamination 91 Conference and Exposition, San Jose, Calif., Oct. 16–18, 1991—Hackett. T. B., and Dillenbeck, K.). When no blow air filtration is used, particle counts in sulfuric acid are initially higher and shedding of particles into the process chemical is continuous. Whereas if air purification is used, particle levels in the sulfuric acid remained constant over the testing period.

Air used in the leak detector must also be highly filtered. A leak detector is a quality assurance test to ensure the integrity of each bottle. Each bottle is pressured with air and multiple pressure readings are taken. For a hole in a bottle greater than 1 mm diameter the final pressure reading is a fraction of the initial pressure reading and the bottle is rejected. Smaller holes in bottles are detected by comparing the change in pressure readings of the previous bottle with the current bottle being tested. Since this leak detector air is injected directly into each bottle, this air should be low in particles. The quality of air in the manufacturing facility is important to preserve the exterior bottle cleanliness. The static charge on plastic bottles attracts particles in the air. Particles attached to the exterior of the bottle are likely to be carried into the wafer fabrication area as a possible contamination source. Air quality in the bottle manufacturing area is monitored at various locations in the cleanroom on a routine basis.

The overall manufacturing area was designed to contain enough high efficiency particulate air filtration to obtain Class 1000 classification. The placement of the high efficiency particulate air filters are highly asymmetric to provide maximum protection to the open mouth of the bottles.

In a typical bottle manufacturing and filling scheme, molded bottles are manufactured in another location and shipped to the filling site. Normal bottle manufacturing is not performed in a cleanroom and bottles are placed into cardboard overpacks for transportation to the filling location. In transit some cardboard dust inevitably becomes attached to the outside of the bottle while some may find its way into the containers, providing particulate and metallic contamination ("Static Forces and Magnetic Fields—Part 1—Research on Adhesion of particles to Charged Wafers Critical in Contamination Control"—Microcontamination, October 1989—Ohmi, T., Inaba, H., and Takenami, T.). The cleanliness of the bottles as delivered in cardboard overpacks were tested before filling and compared to the bottles manufactured in a cleanroom environment (Table 1).

TABLE 1

Particles on Exterior Surface of Bottles Standard vs. Cleanroom Manufacturing

| Bottle No | 0.3 microns | 0.5 microns | 1.0 microns |
|---|---|---|---|
| Standard Environment | | | |
| 1 | 3193 | 2345 | 33 |
| 2 | 710 | 508 | 1635 |
| 3 | 710 | 508 | 373 |
| 4 | 55 | 44 | 38 |
| 5 | 108 | 79 | 44 |
| 6 | 390 | 284 | 175 |
| 7 | 60 | 37 | 25 |
| 8 | 162 | 93 | 51 |
| Average | 603 | 432 | 297 |

| Bottle No. | 0.3 microns | 0.5 microns | 1.0 microns |
|---|---|---|---|
| Cleanroom Environment | | | |
| 1 | 35 | 23 | 18 |
| 2 | 56 | 32 | 18 |
| 3 | 119 | 72 | 44 |
| 4 | 46 | 29 | 21 |
| 5 | 57 | 41 | 26 |
| 6 | 12 | 8 | 5 |
| 7 | 367 | 280 | 190 |
| 8 | 34 | 25 | 18 |
| Average | 91 | 64 | 42 |

The two data sets were compared using two non-parametric tests (*Introduction to the Theory of Non-Parametric Statistics*, John Wiley and Sons, New York, 1978—Randles R. H, an Wolfe), Wilcoxon and Mann-Whitney, to determine differences between the bottles manufactured in a cleanroom and standard environment. The tests showed that bottles manufactured in a cleanroom environment had a statistically significant lower surface particles count.

While particle levels on the outside of the bottle are of interest to reduce the level of contamination introduced into the wafer fabrication cleanroom, particles in the chemical as delivered to the customer are of utmost concern. In a drum dispense application, particles can be reduced by recirculating the chemical through a filter in the chemical dispense system prior to introduction to the distribution line. With bottled chemicals, the luxury of a pre-cleanup before introduction to the process bath is not possible, thus it is important to maintain low particles in the chemicals as delivered to the customer. Table 2 indicates the improvements which were experienced after implementation of the integrated cleanroom blow molding facility.

TABLE 2

Particles in Sulfuric Acid - Cleanroom Manufactured vs. Standard Bottles
Particles in Sulfuric Acid per ml

| | Cleanroom Manufactured Bottles | | | Standard Bottles | | |
|---|---|---|---|---|---|---|
| Bottle # | >0.2 um | >0.5 um | >1.0 um | >0.2 um | >0.5 um | >1.0 um |
| 1 | 287 | 24 | 8 | 1569 | 119 | 23 |
| 2 | 213 | 18 | 5 | 1015 | 71 | 12 |
| 3 | 173 | 19 | 6 | 1669 | 140 | 25 |
| 4 | 170 | 19 | 5 | 1665 | 233 | 33 |
| 5 | 156 | 12 | 3 | 775 | 52 | 9 |
| 6 | 334 | 47 | 4 | 854 | 49 | 8 |
| 7 | 159 | 18 | 6 | 1733 | 166 | 17 |
| 8 | 209 | 22 | 9 | 819 | 58 | 11 |

TABLE 2-continued

Particles in Sulfuric Acid - Cleanroom Manufactured vs. Standard Bottles
Particles in Sulfuric Acid per ml

| Bottle # | Cleanroom Manufactured Bottles | | | Standard Bottles | | |
|---|---|---|---|---|---|---|
| | >0.2 um | >0.5 um | >1.0 um | >0.2 um | >0.5 um | >1.0 um |
| Average | 213 | 22 | 6 | 1262 | 111 | 17 |
| STD. DEV. | 65 | 11 | 2 | 432 | 66 | 9 |

The tests show that sulfuric acid filled in the integrated facility of this invention had purity levels statistically significantly superior to sulfuric acid filled conventionally into bottles not formed in an integrated facility.

In the blow molding process, high density polyethylene resin is heated above its melting point and extruded through a thin annular die. During this process the HDPE molecules become elongated causing internal stresses in the polymer. Annealing is a process that relieves the internal stress on the polymer molecules and results in shrinkage of the plastic bottle. Annealing of the polymer container can take place in one of two ways. First, natural annealing will take place if the bottles are stored in a warehouse for several days. Natural annealing is slow due to the limited mobility of the high molecular weight polyethylene chains. A second annealing option is forced curing. This is accomplished by installing an annealing unit in-line to the bottle handling system. The annealing unit consists of a heating tunnel that increases the temperature of the bottles allowing the molecules in the polyethylene to become more mobile. By exciting the polymer, the polymer relaxation process proceeds quickly and the plastic container obtained in final dimension in a matter of minutes.

The Ideas in Motion Gemini 1000 unit installed is capable of varying the amount of the infra-red radiation as well as the speed of the bottle through the unit. Typically, a temperature of 1,100° F. is used in the annealing unit. Caution must be used to avoid melting the plastic. The objective of the annealing unit is to achieve the same level of polymer shrinkage as would occur naturally in warehousing the bottles before use. This procedure results in bottles which are consistent and of unchanging dimensions produced and delivered to an automated filling line in a continuous process. Chemical quality to the semiconductor industry can be significantly improved with the use of an integrated container manufacturing and packaging facility. Key factors to this improvement are:

Polyethylene resins must be carefully controlled with respect to additives such as metallic catalysts, stabilizers, plasticizers, and release agents.

Air quality around the blow molding machine and blow air quality must be noncontaminating to the containers.

A cleanroom container manufacturing facility that can deliver bottles contamination-free directly to the cleanroom packaging facility.

The results of such effort are clean chemicals delivered to the microelectronics customer free from additional contamination from both the inside and outside of the container.

I claim:

1. An integrated method of making containers for ultra-high purity chemicals used in the fabrication of semiconductor wafers comprising forming molded containers, testing said containers for leaks with injected highly filtered air, exposing said newly formed containers to ionized air, conveying said containers to a filling area, exposing said containers to ionized air while conveying said containers, and filling said containers with ultra-high purity chemicals, all steps occurring in an environment maintained free of contamination according to semiconductor manufacturer standards which are defined as a resistivity of ultra pure water of at least 18 megohm-cm at 25° C., less than about 25 ppb of electrolytes other than said ultra-high purity chemical itself, a particulate content of less than 150/ml and a particle size less than 0.2 micron, a microorganism content less than 10/ml and total organic carbon less than 100 ppb.

2. An integrated system for production of ultra high purity chemicals in containers, said system comprising a facility for molding containers using molten resin wherein said molded containers are exposed to ionized air, a filling area adjoining said facility wherein said containers are filled with ultra high purity chemicals, means for conveying said containers to said filling area, and means for treating said containers with ionized air while conveying, said facility, said area and said conveying means all being contained in an environment maintained free of contamination meeting semiconductor manufacturing standards at class 1000 level particulate filtration so that analysis of said chemicals shows half the >1.0 μm particles, one fifth the >0.5 μm particles, and one sixth the >0.2 μm particles of chemicals filled in standard bottles.

3. The production system of claim 2 wherein said containers are blow molded.

4. The production system of claim 2 wherein said conveying means are situated in a tunnel.

5. The production system of claim 1 wherein said containers are molded under conditions such that said containers are molded at a rate approximately equal to that at which said containers will be filled.

6. The production system of claim 2 wherein said ultra high purity chemical is sulfuric acid.

7. The production of claim 2 wherein said containers are bottles.

8. The production system of claim 2 wherein said resin comprises high density polyethylene resin.

9. The production system of claim 2 wherein said resin comprises halogenated carbon polymer resin.

10. The production system of claim 2 wherein said resin comprises polypropylene resin.

11. The production system of claim 2 wherein said resin comprises nylon.

12. The production system of claim 2 wherein said ultra high purity chemical is acetone.

13. The production system of claim 2 wherein said ultra high purity chemical is hydrogen peroxide.

14. The production system of claim 2 wherein said ultra high purity chemical is isopropyl alcohol.

15. The production system of claim 2 wherein said ultra high purity chemical is phosphoric acid.

16. The production system of claim 2 wherein said ultra high purity chemical is nitric acid.

17. The production system of claim 2 wherein said ultra high purity chemical is hydrochloric acid.

18. The production system of claim 2 wherein said ultra high purity chemical is aqueous hydrogen fluoride.

19. The production system of claim 2 wherein said containers are drums.

20. The production system of claim 2 wherein said containers are tote packs.

* * * * *